Feb. 2, 1926.
1,571,184
W. M. CADY
AUTOMOTIVE BRAKE
Filed March 10, 1924
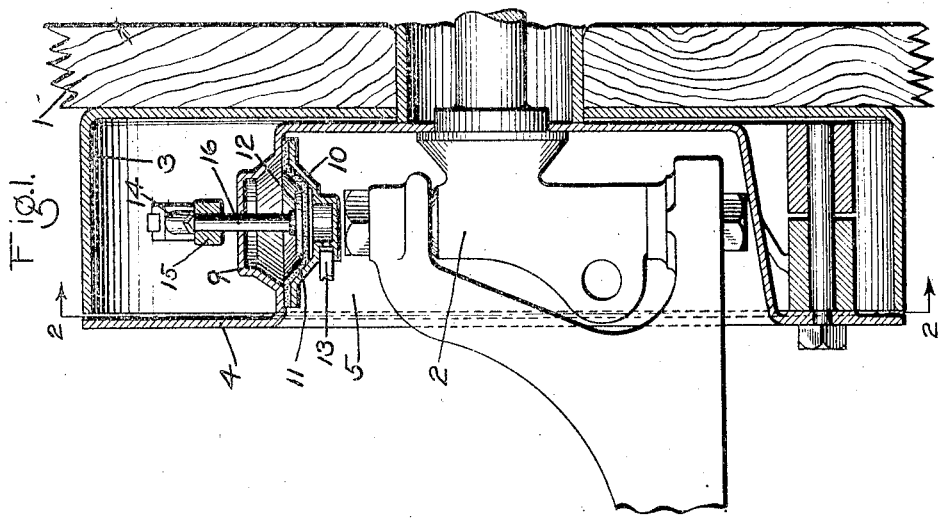
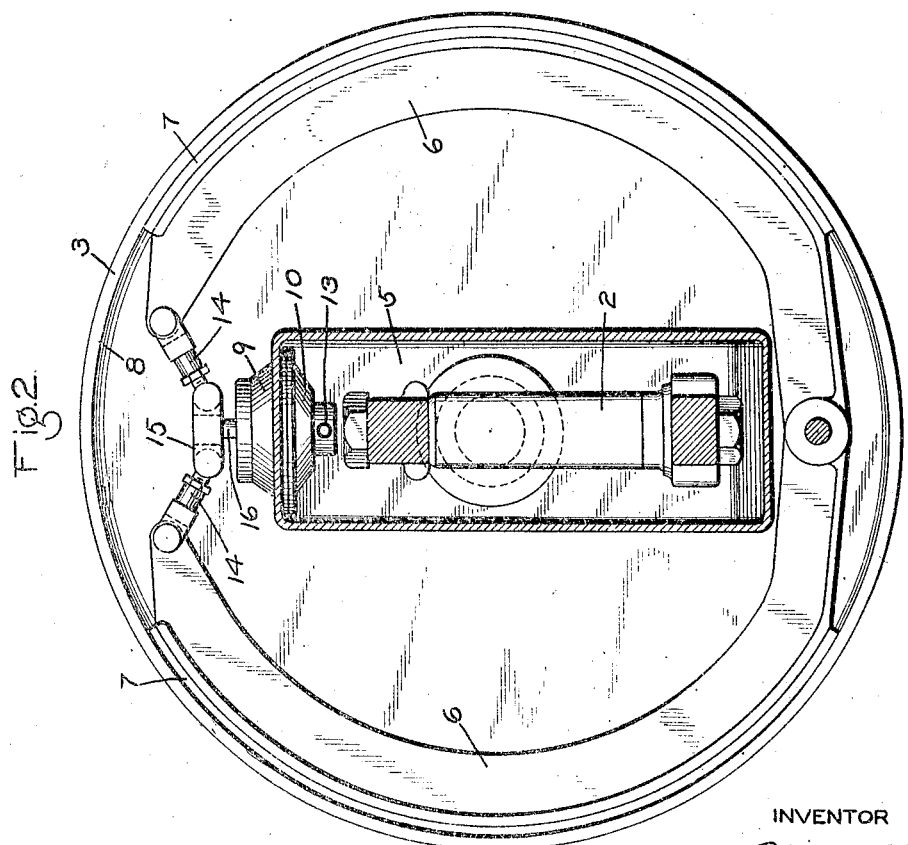
INVENTOR
Wm. M. Cady

UNITED STATES PATENT OFFICE.

WILLIAM M. CADY, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed March 10, 1924. Serial No. 698,270.

*To all whom it may concern:*

Be it known that I, WILLIAM M. CADY, a citizen of the United States, residing in Edgewood, in the county of Allegheny and State of Pennsylvania, have invented a certain new and useful Improvement in Automotive Brakes, of which the following is a specification.

This invention relates to brakes, and more particularly to a fluid pressure front wheel brake for motor vehicles.

The principal object of my invention is to provide an improved brake of the above character.

In the accompanying drawing; Fig. 1 is a central sectional view of a fluid pressure front wheel brake embodying my invention; and Fig. 2 a section on the line 2—2 of Fig. 1.

In Fig. 1 is shown a portion 1 of a vehicle front wheel and the usual steering knuckle 2 for supporting the front wheel. A brake drum 3 is secured to the front wheel and is provided with a cover plate 4 having a central depression 5 for receiving the knuckle 2. Pivotally connected brake heads 6 are mounted within the drum 3 and are provided with brake shoes 7 adapted to engage the internal friction face 8 of the drum 3.

According to my invention, the upper wall 9 of the depression 5 is formed to provide a brake chamber, a cover plate 10 being provided, having an annular flange for securing same to the wall 9.

Interposed between the wall or brake chamber 9 and the cover plate 10 is a flexible diaphragm 11 having a pressure plate 12 engaging one side and having the chamber at the other side open to a fluid pressure supply and release pipe 13.

Links 14, pivotally connected to the free ends of the brake heads 6, are pivotally connected to a crosshead 15, secured to a diaphragm rod 16, which is carried by the pressure plate 12.

When fluid under pressure is supplied through pipe 13 to the diaphragm 11, said diaphragm is moved upwardly, operating the rod 16 so that the links 14 act to spread the ends of the brake heads 6.

The brake heads 6 are thus expanded, causing the brake shoes 7 to frictionally engage the internal friction face of the brake drum and thus effect an application of the brakes.

By forming the brake chamber in the cover plate 4 and in the upper wall of the depression 5, a compact construction is provided, wherein the brake chamber is wholly contained within the brake drum.

Having now described my invention, what I claim as new and desire to secure by Letters Patent, is:—

The combination with a brake drum and brake heads mounted in said drum, of a cover plate for said drum having a central depression extending into said drum, one of the side walls of said depression having a brake chamber formed therein, and a movable abutment in said chamber operatively connected to said brake heads.

In testimony whereof I have hereunto set my hand.

WILLIAM M. CADY.